(12) United States Patent
Chen et al.

(10) Patent No.: US 11,088,418 B2
(45) Date of Patent: Aug. 10, 2021

(54) BATTERY MODULE

(71) Applicant: CONTEMPORARY AMPEREX TECHNOLOGY CO., LIMITED, Ningde (CN)

(72) Inventors: Sien Chen, Ningde (CN); Shoujiang Xu, Ningde (CN); Chunyan Feng, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 236 days.

(21) Appl. No.: 16/535,396

(22) Filed: Aug. 8, 2019

(65) Prior Publication Data

US 2020/0274120 A1  Aug. 27, 2020

(30) Foreign Application Priority Data

Feb. 26, 2019 (CN) .......................... 201920240330.6

(51) Int. Cl.
| | |
|---|---|
| *H01M 2/10* | (2006.01) |
| *H01M 10/659* | (2014.01) |
| *H01M 10/04* | (2006.01) |
| *H01M 2/26* | (2006.01) |
| *H01M 10/6554* | (2014.01) |
| *H01M 50/24* | (2021.01) |
| *H01M 50/20* | (2021.01) |
| *H01M 50/54* | (2021.01) |

(52) U.S. Cl.
CPC ....... *H01M 50/24* (2021.01); *H01M 10/0481* (2013.01); *H01M 10/659* (2015.04); *H01M 10/6554* (2015.04); *H01M 50/20* (2021.01); *H01M 50/54* (2021.01)

(58) Field of Classification Search
None
See application file for complete search history.

(56) References Cited

U.S. PATENT DOCUMENTS

| | | | | |
|---|---|---|---|---|
| 5,756,227 | A | * 5/1998 | Suzuki | H01M 10/647 429/62 |
| 2008/0160395 | A1 | * 7/2008 | Okada | B60L 50/64 429/99 |
| 2011/0117409 | A1 | * 5/2011 | Lee | H01M 50/20 429/99 |

(Continued)

OTHER PUBLICATIONS

Extended European Search Report from corresponding European Application No. 19191417.5 dated Feb. 27, 2020.

*Primary Examiner* — Amanda J Barrow
(74) *Attorney, Agent, or Firm* — Tucker Ellis LLP

(57) ABSTRACT

The present disclosure provides a battery module, including: a plurality of batteries that is stacked; an end plate disposed at an end of the plurality of batteries in a direction, along which the plurality of batteries are stacked; an electric insulation component disposed between the end plate and a battery of the plurality of batteries adjacent to the end plate, the electric insulation component comprising at least one mounting portion; and at least one heat insulation component disposed below the end plate and connected to a bottom of the end plate. Each of the at least one heat insulation component is detachably connected to a corresponding one of the at least one mounting portion.

10 Claims, 7 Drawing Sheets

(56) References Cited

U.S. PATENT DOCUMENTS

| | | | | |
|---|---|---|---|---|
| 2011/0206948 A1* | 8/2011 | Asai | .................... | H01M 10/652 |
| | | | | 429/7 |
| 2011/0294000 A1* | 12/2011 | Kim | ..................... | H01M 50/20 |
| | | | | 429/176 |
| 2012/0052359 A1* | 3/2012 | Yoshitake | ........... | H01M 10/647 |
| | | | | 429/120 |
| 2015/0044544 A1* | 2/2015 | Idikurt | .................... | B60K 1/04 |
| | | | | 429/159 |
| 2017/0084886 A1* | 3/2017 | Tononishi | .............. | H01G 11/82 |
| 2017/0352850 A1 | 12/2017 | Nagane et al. | | |

* cited by examiner

BATTERY MODULE

CROSS-REFERENCE TO RELATED APPLICATIONS

The present application claims priority to Chinese Patent Application No. 201920240330.6, filed on Feb. 26, 2019, the content of which is incorporated herein by reference in its entirety.

TECHNICAL FIELD

The present disclosure relates to the technical field of energy storage, and in particular, to a battery module.

BACKGROUND

A battery module includes a plurality of batteries, end plates disposed at two ends of the plurality of batteries, and side plates disposed on two sides of the plurality of batteries. The end plates are fixedly connected to the side plates to clamp the batteries. During the operation of the battery module, it is required to maintain a temperature uniformity of the batteries. Therefore, the batteries should be thermally insulated from the external environment.

The end plates of the battery module are made of metal, and thus have a high thermal conductivity, such that the batteries close to the end plates have a higher rate of heat transfer, which would result in a poor temperature uniformity of the batteries.

SUMMARY

In view of the above, the present disclosure provides a battery module, aiming to solve the problem of the poor temperature uniformity of the batteries and the short service life of the battery module.

The present disclosure provides a battery module, including: a plurality of batteries that is stacked; an end plate disposed at an end of the plurality of batteries in a direction, along which the plurality of batteries are stacked; an electric insulation component disposed between the end plate and a battery of the plurality of batteries adjacent to the end plate, the electric insulation component including at least one mounting portion; and at least one heat insulation component disposed below the end plate and connected to a bottom of the end plate. Each of the at least one heat insulation component is detachably connected to a corresponding one of the at least one mounting portion.

In an embodiment, the electric insulation component further includes an insulation body disposed between the end plate and the battery adjacent to the end plate. The at least one mounting portion is disposed below the end plate, and the at least one mounting portion is connected to the insulation body and extends towards the end plate. Each of the at least one mounting portion is provided with a first mounting hole, in which a corresponding one of the at least one heat insulation component is mounted through interference fit.

In an embodiment, each of the at least one heat insulation component is provided with at least one dismounting hole.

In an embodiment, each of the at least one heat insulation component includes two ends each provided with a recess, the recess and a side wall of the first mounting hole define a dismounting hole.

In an embodiment, the electric insulation component further includes an insulation body disposed between the end plate and the battery adjacent to the end plate. The at least one mounting portion is disposed below the end plate, and the at least one mounting portion is connected to the insulation body and extends towards the end plate. Each of the at least one mounting portion is provided with a first mounting hole, the first mounting hole is a threaded hole, each of the at least one heat insulation component is provided with threads on its periphery, and is connected to the first mounting hole through the threads.

In an embodiment, each of the at least one heat insulation component is further provided with a second mounting hole, and the end plate is provided with an end plate mounting hole. The second mounting hole and the end plate mounting hole are coaxial. The battery module further includes a fastener penetrating through the second mounting hole and the end plate mounting hole and connecting the end plate with the at least one heat insulation component.

In an embodiment, each of the at least one heat insulation component includes a connecting post, the end plate includes an end plate mounting hole, and the connecting post is inserted into the end plate mounting hole to connect the at least one heat insulation component with the end plate.

In an embodiment, each of the at least one mounting portion includes a mounting plate provided with the first mounting hole, and reinforcing plates provided at two sides of the mounting plate. The mounting plate and the reinforcing plates are connected to the insulation body.

In an embodiment, each of the at least one heat insulation component includes a thickness greater than a depth of the first mounting hole. Each of the at least one heat insulation component includes an upper end surface protruding from an upper surface of the mounting plate by 0 mm to 2 mm, and a lower end surface protruding from a lower surface of the mounting plate by 0 mm to 2 mm.

In an embodiment, each of the at least one heat insulation component is made of epoxy resin, plastic, or ceramic.

In the present application, the bottom of the end plate of the battery module is connected to the heat insulation component, so that the end plate and other components located at the bottom thereof are separated by the heat insulation component, and the heat conduction efficiency of the end plate is lowered, thereby improving the temperature uniformity of the batteries of the battery module. Moreover, since the heat insulation component is detachably connected to the mounting portion of the electric insulation component, the damaged heat insulation component can be dismounted from the mounting portion and replaced, thereby prolonging the service life of the battery module.

BRIEF DESCRIPTION OF DRAWINGS

In order to more clearly illustrate the technical solutions of the embodiments of the present disclosure, the drawings used in the embodiments will be briefly described as below. The drawings described below are merely some embodiments of the present disclosure. Based on these drawings, those skilled in the art can obtain other drawings without paying creative efforts.

Figure 1:
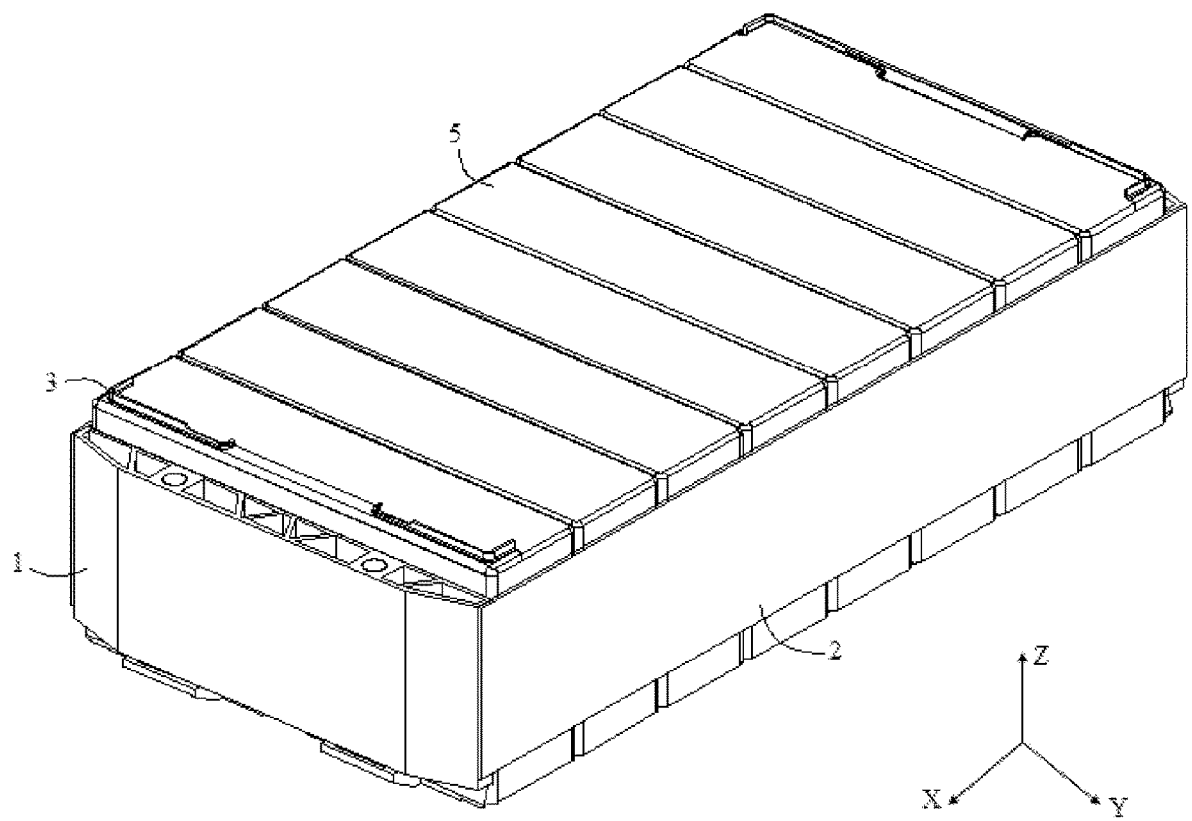
FIG. 1 is an exploded view of a battery module according to an embodiment of the present disclosure.

REFERENCE NUMBER 1 end plate
11 end plate mounting hole
2 side plate
3 electric insulation component
31 insulation body
32 mounting portion
321 mounting plate
321a first mounting hole
321b upper surface
321c lower surface
322 reinforcing plate
4 heat insulation component
41 dismounting hole
411 recess
42 second mounting hole
43 upper end surface
44 lower end surface
5 battery

DESCRIPTION OF EMBODIMENTS

For better understanding the technical solutions of the present disclosure, the embodiments of the present disclosure will be described in detail below with reference to the accompanying drawings.

It should be understood that, the described embodiments are merely parts of, rather than all of the embodiments of the present disclosure. Based on these embodiments described in the present disclosure, other embodiments obtained by those skilled in the art without paying creative efforts shall fall within the protection scope of the present disclosure.

The terms in the embodiments of the present disclosure are merely used for describing specific embodiments, but not intended to limit the present disclosure. The singular forms such as "a", "an", "said" and "the" are also intended to include the plural forms, unless the context indicates otherwise.

It should be understood that the term "and/or" used in the context of the present disclosure is to describe a correlation relation of related objects, indicating that there may be three relations, e.g., A and/or B may indicate only A, both A and B, and only B. In addition, the symbol "/" in the context generally indicates that the relation between the objects in front and at the back of "/" is an "or" relationship.

It should be understood that terms indicating orientations or positions, such as "upper", "lower", "left", "right", etc., generally are used to describe the orientations or positions with reference to the drawings, and thus should not be construed as a limitation of the present disclosure. It also should be understood that when an element is referred as being "on" or "under" another element, the element can be directly located "on" or "under" another element or connected to another element with an intermediate element.

Figure 2:
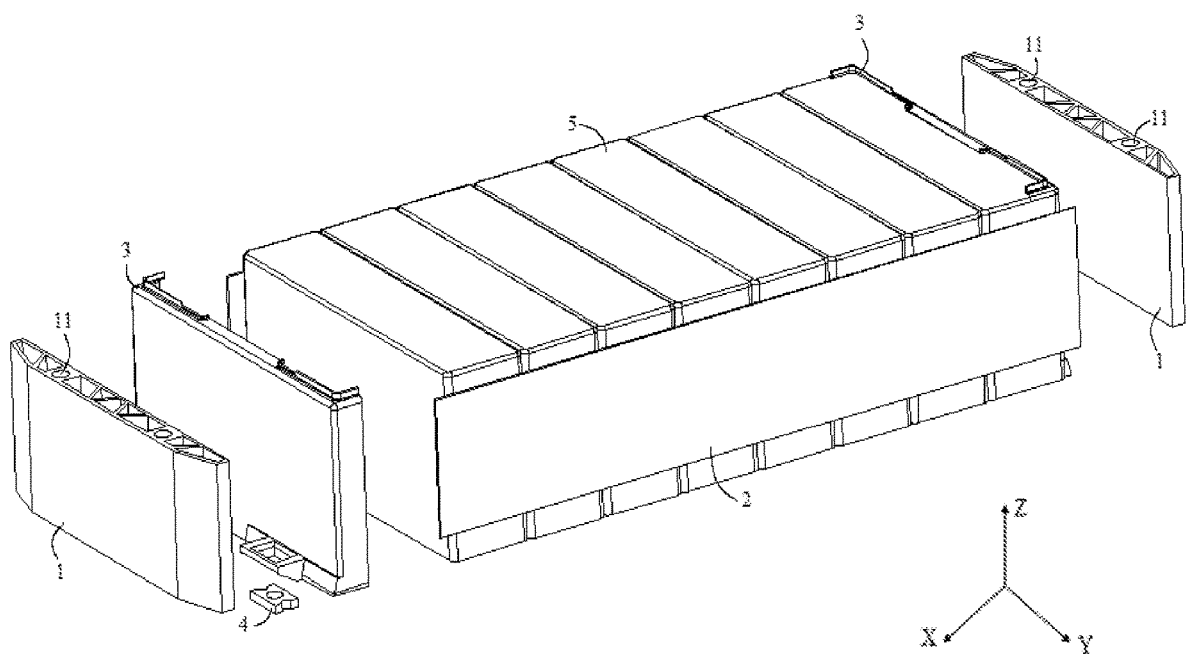
FIG. 2 is an exploded view of FIG. 1.
Figure 3:
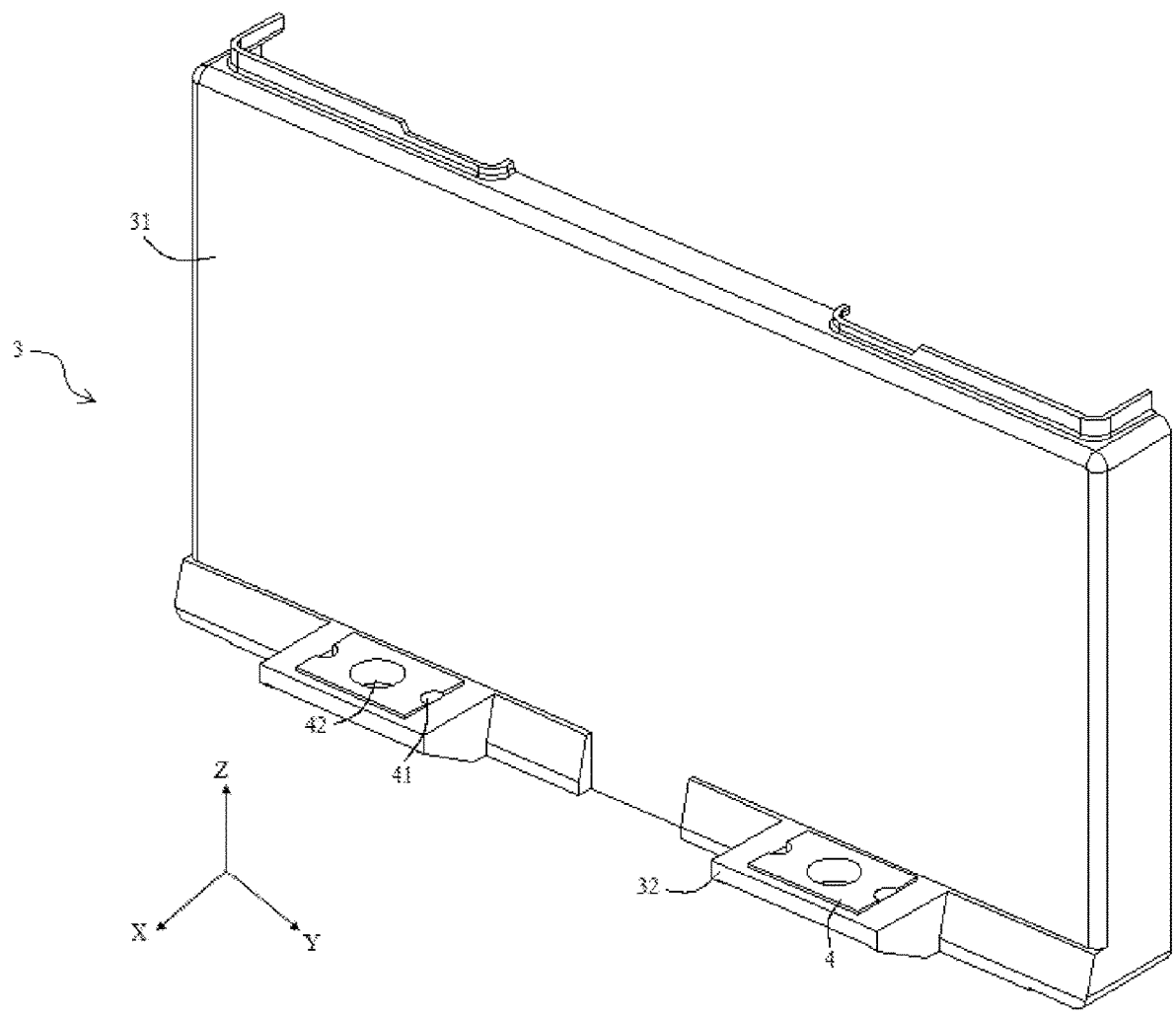
FIG. 3 is a structural schematic diagram illustrating that an electric insulation component is matched with a heat insulation component shown in FIG. 1.
Figure 4:
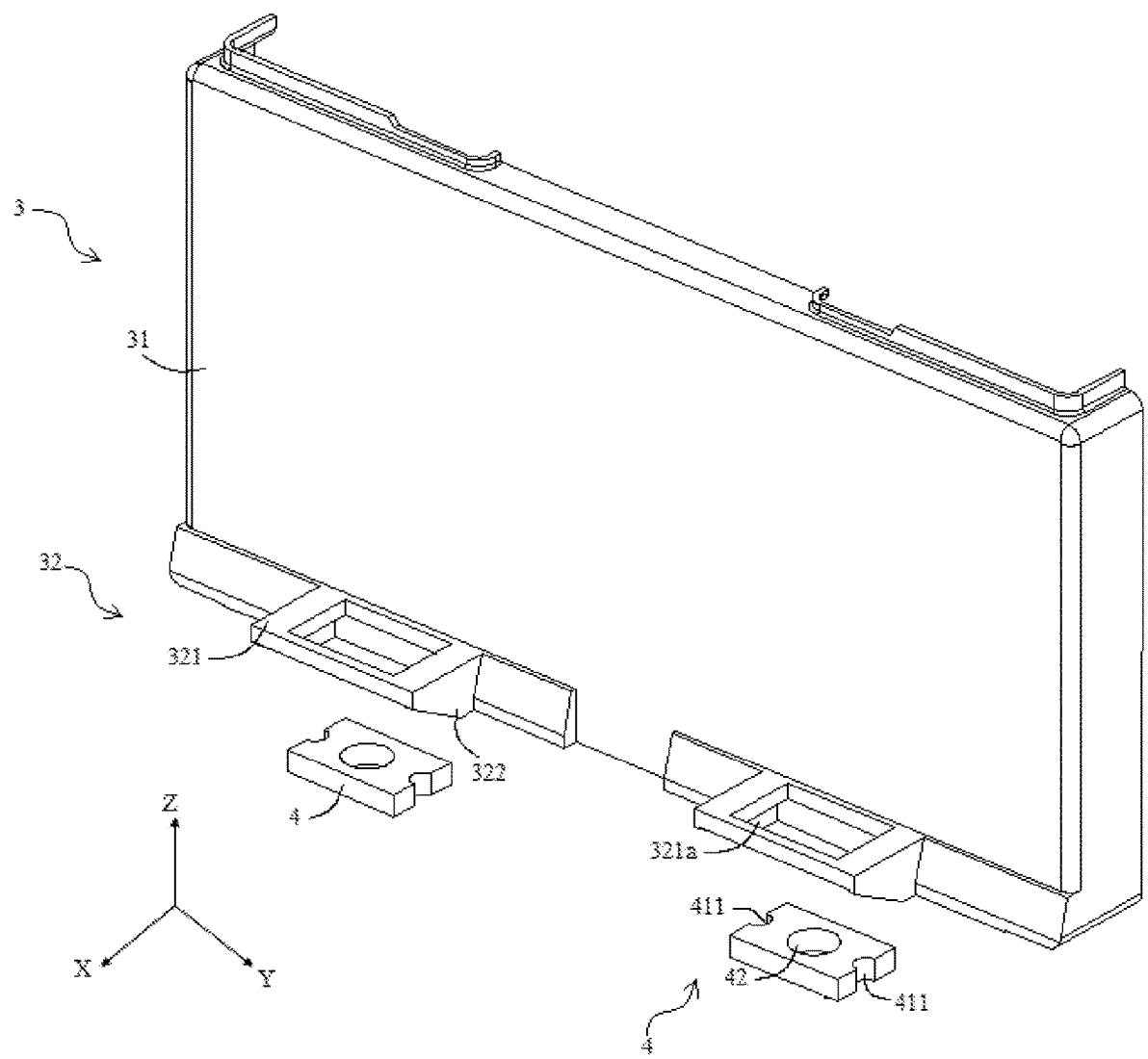
FIG. 4 is an exploded view of FIG. 3.
Figure 5:
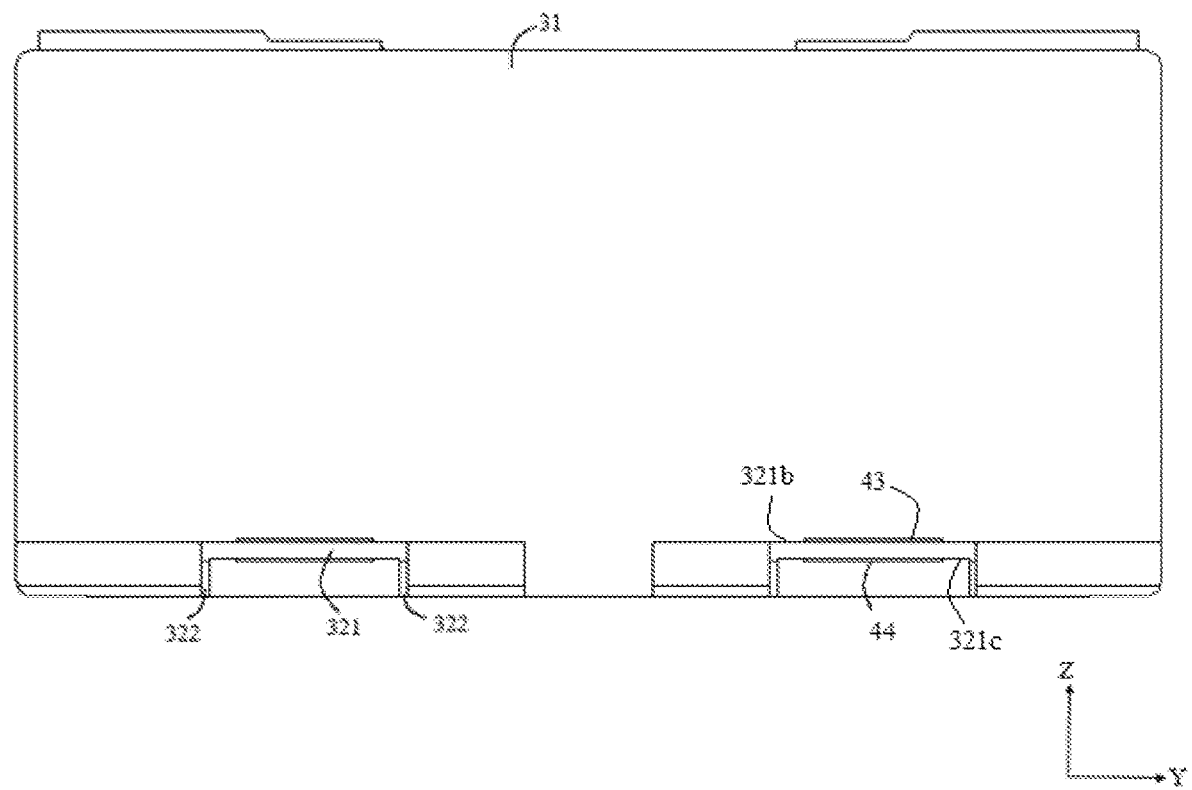
FIG. 5 is a front view of FIG. 3.
Figure 6:
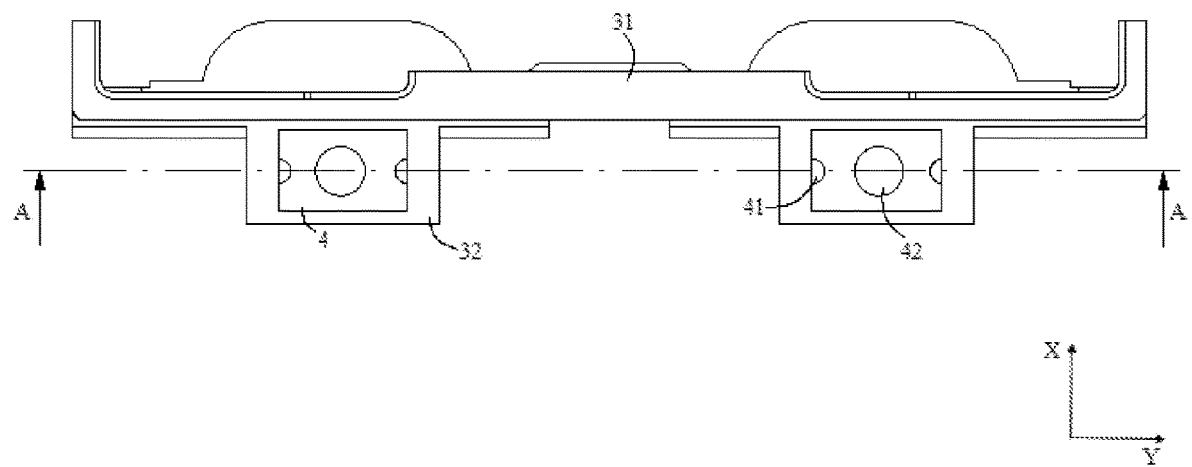
FIG. 6 is a top view of FIG. 3.
Figure 7:
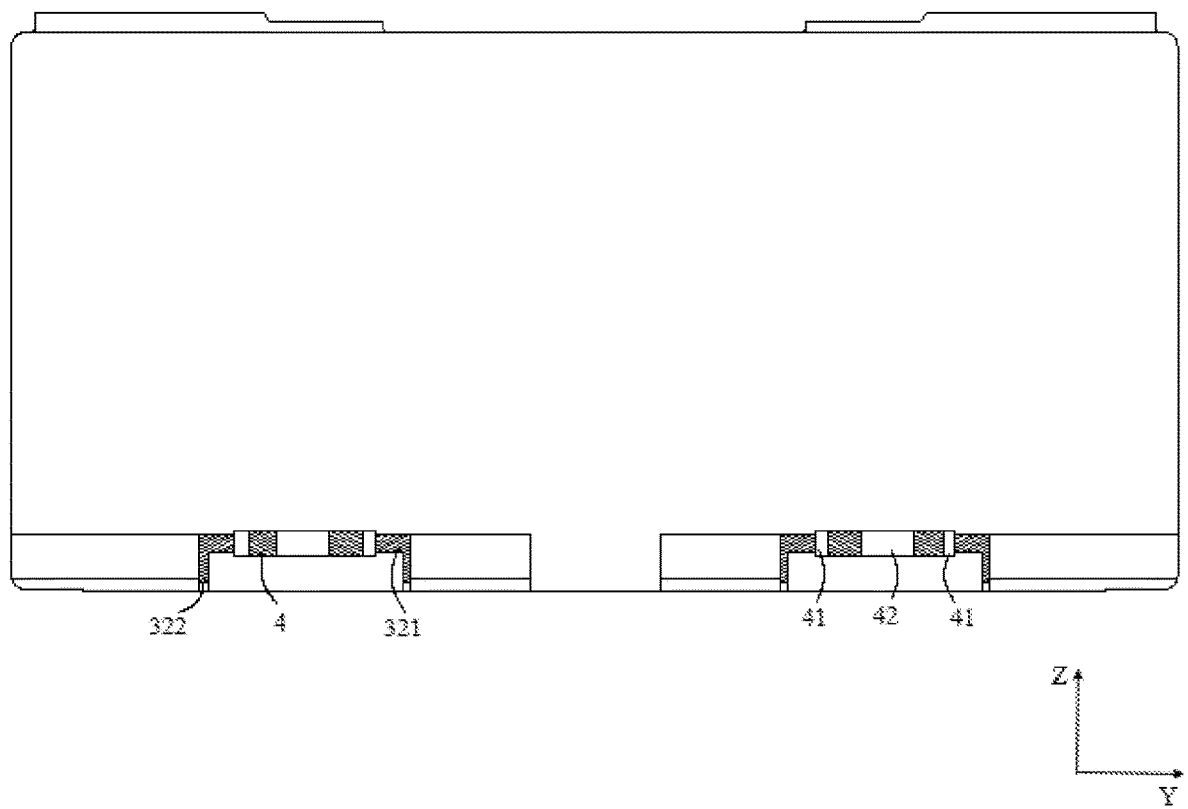
FIG. 7 is a cross-sectional view along A-A in FIG. 6.

Referring to FIG. 1 to FIG. 7, FIG. 1 is an exploded view of a battery module according to an embodiment of the present disclosure, FIG. 2 is an exploded view of FIG. 1, FIG. 3 is a structural schematic diagram illustrating that an electric insulation component is matched with a heat insulation component shown in FIG. 1, FIG. 4 is an exploded view of FIG. 3, FIG. 5 is a front view of FIG. 3, FIG. 6 is a top view of FIG. 3, and FIG. 7 is a cross-sectional view along A-A in FIG. 6.

In an embodiment shown in FIG. 1 and FIG. 2, the present disclosure provides a battery module. The battery module includes a plurality of batteries 5 that is stacked, and end plates 1 disposed at ends of the plurality of batteries 5 along a direction, in which the batteries are stacked (a direction X as shown in FIG. 1). Two end plates 1 are provided and arranged opposite to each other in the direction X. An electric insulation component 3 is provided between the end plate 1 and a battery 5 adjacent to the end plate 1. In addition, the battery module further includes two side plates 2 disposed opposite to each other in a direction Y. Once the end plates 1 and the side plates 2 are fixed by laser welding, the electric insulation component 3 and the batteries 5 can be clamped to form the battery module shown in FIG. 1.

As shown in FIG. 2, the electric insulation component 3 is located between the end plate 1 and the battery 5 adjacent to the end plate 1, for insulating the end plate 1 from the battery 5 adjacent to the end plate 1. The electric insulation component 3 has good properties of both heat insulation and electric insulation, and thus can be used as a thermally and electrically insulating structure between the end plate 1 and the battery 5 adjacent to the end plate 1.

As described above, the electric insulation component 3 is clamped between the end plate 1 and the battery 5 adjacent to the end plate 1, and can provide an end surface of the end plate 1 with good heat insulation. However, during the assembly of the battery module, it is possible that a bottom of the end plate 1 is in contact with other metal structures, such as a mounting seat of a battery pack or the like, resulting in the problem of the temperature non-uniformity of batteries 5 caused by heat conduction from the bottom of the end plate 1.

In order to solve the above technical problem, the end plate 1 according to the present disclosure is provided with at least one heat insulation component 4 at its bottom, so as to separate the end plate 1 from the other metal structures by the heat insulation component 4. In this way, the bottom of the end plate 1 has a reduced heat conduction efficiency, and the temperature uniformity of the battery 5 is improved. At the same time, the heat insulation component 4 disposed at the bottom of the end plate 1 is easily damaged. Therefore, in order to ensure that the battery module 5 can have a good temperature uniformity during a long-term operation, the damaged heat insulation component 4 is required to be replaced timely.

For example, the heat insulation component 4 is mounted on the electric insulation component 3. In order to achieve a replaceability of the heat insulation component 4, the present disclosure adopts a structure as shown in FIG. 3, in which at least one mounting portion 32 is provided at the bottom of the electric insulation component 3, and the heat insulation component 4 is detachably connected to a corresponding mounting portion 32, while the bottom of the end plate 1 is connected to the heat insulation component 4.

Therefore, in the present application, the bottom of the end plate 1 of the battery module is connected to the heat insulation component 4, so that the end plate 1 and other components located at the bottom thereof are separated by the heat insulation component 4, thereby lowering the heat conduction efficiency of the end plate 1 and improving the temperature uniformity of the batteries 5 of the battery module. At the same time, since the heat insulation component 4 is detachably connected to the mounting portion 32, the heat insulation component 4, when being damaged, can be dismounted from the mounting portion 32 and replaced, thereby prolonging the service life of the battery module.

As shown in FIG. 4, the electric insulation component 3 includes an insulation body 31, and the insulation body 31 is located between the end plate 1 and the battery 5 adjacent to the end plate 1. In this way, the insulation body 31 is used for the thermal and electrical insulation between an end surface of the end plate 1 and the battery 5 adjacent to the end plate 1. At the same time, the insertion body 31 has at least one mounting portion 32 at its bottom. The mounting portion 32 is located below the end plate 1. The mounting portion 32 is fixedly connected to the insulation body 31, and the mounting portion 32 extends in a direction facing towards the end plate 1, i.e., the mounting portion 32 extends in the direction X.

The mounting portion 32 is provided with a first mounting hole 321a matched with the heat insulation component 4, and the heat insulation component 4 is mounted in the first mounting hole 321a through interference fit.

In the present disclosure, the heat insulation component 4 is connected to the mounting portion 32 by pressing the heat insulation component 4 to the first mounting hole 321a through interference fit. Meanwhile, as shown in FIG. 3, the heat insulation component 4 is provided with at least one dismounting hole 41, and the heat insulation component 3 can be easily removed from the first mounting hole 321a by means of the dismounting hole 41.

In another embodiment, as shown in FIG. 4, the heat insulation component 4 is in a plate-like structure, and has two opposite ends each provided with a recess 411. When the heat insulation component 4 is mounted in the first mounting hole 321a of the mounting portion 32 through interference fit, a side wall of the recess 411 and a side wall of the first mounting hole 321a define a dismounting hole 41.

In the above embodiments, the dismounting hole 41 can have a shape of circle, semicircle, arc, rectangle, triangle, polygon, or the like.

Therefore, the heat insulation component 4 has two opposite dismounting holes 41, and the dismounting holes 41 are configured to receive a dismounting tool. For example, the dismounting tool can be a columnar structure having a size slightly larger than the dismounting hole 41. When the heat insulation component 4 is necessary to be replaced, the dismounting tool is placed into the dismounting holes 41 to apply pressure on the heat insulation component 4, so as to push the heat insulation component 4 out from the first mounting hole 321a.

In another embodiment, when the heat insulation component 4 has two dismounting holes 41, the disassembly tool also can be a clamp. The clamp has two legs each protruding into a corresponding dismounting hole 41, and pulls the heat insulation component 4 out of the first mounting hole 321a.

In addition, in order to minimize damage to the mounting portion 32 during the dismounting of the heat insulation component 4, when the heat insulation component 4 has to be removed from the first mounting hole 321a, liquid nitrogen cooling can be employed to cause a contraction of the heat insulation component 4, which can facilitate removing from the first mounting hole 321a.

In the embodiment shown in FIG. 4, the recess 411 is a semi-circular structure and has a diameter of 4 mm to 6 mm, preferably 5 mm. The shape and size of the recess 411 are not limited thereto, and the recess 411 also can be a square hole, a trapezoidal hole, a triangular hole or the like. In addition, two recesses 411 can also be provided at two ends of the heat insulation component 4 along the direction X, instead of being provided at the two ends of the heat insulation component 4 along the direction Y. However, since the heat insulation component 4 has sufficient space at two ends in the direction Y, it is conducive to the dismounting of the heat insulation component 4 to provide the two recesses 411 at the ends along the direction Y.

The mounting and dismounting manner between the heat insulation component 4 and the first mounting hole 321a is not limited to the interference pressing fit. For example, the heat insulation component 4 can also be provided with external threads, and the first mounting hole 321a can be a threaded hole having internal threads, such that the heat insulation component 4 can be detachably connected to the mounting portion 32 through screw-thread fit between the heat insulation component 4 and the first mounting hole 321a.

In the above embodiments, the end plate 1 is provided with an end plate mounting hole 11, as shown in FIG. 2. It can be understood that the end plate mounting hole 11 penetrates the end plate 1 in a direction Z. As shown in FIG. 4, the heat insulation component 4 is further provided with a second mounting hole 42, and the second mounting hole 42 and the end plate mounting hole 11 have a same diameter and are coaxial. The battery module can further include a fastener (not shown) such as bolts, screws, etc., such that when the bottom of the end plate 1 abuts against the heat insulation component 4, the fastener passes through the second mounting hole 42 and the end plate mounting hole 11 to connect the end plate 1 with the heat insulation component 4. For example, the second mounting hole has a diameter of 6 mm to 10 mm, preferably 8 mm.

The end plate 1 can be connected to the heat insulation component 4 in the following way. The heat insulation component 4 is provided with a connecting post (not shown) at its upper end surface facing towards the end plate 1, the connecting post is matched with the end plate mounting hole 11 of the end plate 1, and the connecting post is inserted into the end plate mounting hole 11 to connect the heat insulation component 4 with the end plate 1. In addition, when the heat insulation component 4 is connected to the mounting portion 32 through screw-thread fit, the connecting post can also serve as an operating portion during the process of the screw-thread fit of those two, thereby sufficiently utilizing each component.

In another aspect, in the embodiments shown in FIG. 4, FIG. 5 and FIG. 7, the mounting portion 32 includes a mounting plate 321 and reinforcing plates 322. The mounting plate 321 has an end surface perpendicular to the direction Z, i.e., the mounting plate 321 is perpendicular to the end plate 1. The above first mounting hole 321a is provided in the mounting plate 321. The reinforcing plates 322 are disposed on two sides of the mounting plate 321, and the mounting plate 321 and the reinforcing plates 322 are fixedly connected to the insulation body 31.

In the present embodiment, the mounting portion 32 can be formed with the insulation body 31 as one piece, or can be a structure to be fixedly connected to the insulation body 31. Similarly, the reinforcing plates 322 can be formed with the mounting plate 321 as one piece, or can be fixedly connected to the mounting plate 321. The reinforcing plate 322 in this embodiment has a trapezoidal structure, which has its lower bottom (a bottom surface having the greater length) fixed to the insulation body 31. Since the bottom of the trapezoidal structure has the greater length, a connection area between the reinforcing plates 322 and the insulation body 31 is increased, thereby improving the connection reliability between the mounting portion 32 and the insulation body 31 and enhancing the strength and rigidity of the mounting portion 32 itself.

Further, as shown in FIG. 5 and FIG. 7, the heat insulation component 4 has its upper end surface 43 protruding from an upper surface 321b of the mounting plate 321 and its lower end surface 44 protruding from a lower surface 321c of the mounting plate 321.

Generally, the electric insulation component 3 is made of a material having a relatively low strength, i.e., the strength of the mounting portion 32 is relatively low. After providing the heat insulation component 4, the mounting portion 32 is not suitable as a main force-receiving component. In the present disclosure, the heat insulation component 4 has a thickness greater than a depth of the first mounting hole 321a. That is, the upper end surface 43 of the heat insulation component 4 protrudes from the upper surface 321b of the mounting plate 321 by a first predetermined size, and the lower end surface 44 protrudes from the lower surface 321c of the mounting plate 321 by a second predetermined size. During the assembly of the components of the battery module and after completing the assembly, the upper end surface 43 and the lower end surface 44 of the heat insulation component 4 serve as main force-receiving portions, thereby preventing the mounting portion 32 from being damaged when acting as the main force-receiving component.

The first predetermined size is in a range of 0 mm to 2 mm, for example, 1 mm, 1.5 mm, etc., and the second predetermined size is in a range of 0 mm to 2 mm, such as 0.8 mm, 1.7 mm, etc. The first predetermined size and the second predetermined size can be equal or unequal, and there is no strict relationship between their sizes.

The heat insulation component 4 can be made of one or more selected from epoxy resin, plastic, and ceramic. The epoxy resin has good thermal and electrical insulation properties and high strength, which can achieve the above-mentioned functions of the heat insulation component 4.

In the present disclosure, the heat insulation component 4 can have a structure of a rectangular flat plate and a size of 21 mm*14 mm*2.5 mm. That is, the epoxy resin plate has a length of 21 mm, a width of 14 mm, and a thickness of 2.5 mm. The size of the heat insulation component 4 is not limited thereto, and may be arbitrarily selected according to actual conditions.

Correspondingly, the first mounting hole 321a of the mounting portion 32 is also a rectangular hole. The shapes and sizes of the first mounting hole 321a and the heat insulation component 4 are not specifically limited, as long as they can match each other. In the embodiments of the present disclosure, since the insulation body 31 is provided with two mounting portions 31 distributed along the direction Y, the battery module accordingly includes two heat insulation components 4, and the two heat insulation components 4 have the same heights in the direction Z. The end plate 1 can abut against and be connected to the upper end surfaces 43 of the two heat insulation components 4. The number of heat insulation components 4 is not limited in the present disclosure.

The above embodiments of the present disclosure are merely preferable embodiments, but not intended to limit the scope of the present disclosure. Any changes, equivalent substitutions or improvements made upon the concept of the present disclosure should fall into the protection scope of the present disclosure.

What is claimed is:

1. A battery module, comprising:
   a plurality of batteries that is stacked;
   an end plate disposed at an end of the plurality of batteries in a direction, along which the plurality of batteries are stacked;
   an electric insulation component disposed between the end plate and a battery of the plurality of batteries adjacent to the end plate, the electric insulation component comprising at least one mounting portion; and
   at least one heat insulation component disposed below the end plate and connected to a bottom of the end plate,
   wherein each of the at least one heat insulation component is detachably connected to a corresponding one of the at least one mounting portion.

2. The battery module according to claim 1, wherein the electric insulation component further comprises an insulation body disposed between the end plate and the battery adjacent to the end plate,
   the at least one mounting portion is disposed below the end plate, and the at least one mounting portion is connected to the insulation body and extends towards the end plate, and
   each of the at least one mounting portion is provided with a first mounting hole, in which a corresponding one of the at least one heat insulation component is mounted through interference fit.

3. The battery module according to claim 2, wherein each of the at least one heat insulation component is provided with at least one dismounting hole.

4. The battery module according to claim 2, wherein each of the at least one heat insulation component comprises two ends each provided with a recess, the recess and a side wall of the first mounting hole define a dismounting hole.

5. The battery module according to claim 1, wherein the electric insulation component further comprises an insulation body disposed between the end plate and the battery adjacent to the end plate,
   the at least one mounting portion is disposed below the end plate, and the at least one mounting portion is connected to the insulation body and extends towards the end plate, and
   each of the at least one mounting portion is provided with a first mounting hole, the first mounting hole is a threaded hole, each of the at least one heat insulation component is provided with threads on its periphery, and is connected to the first mounting hole through the threads.

6. The battery module according to claim 1, wherein each of the at least one heat insulation component is further provided with a second mounting hole, and the end plate is provided with an end plate mounting hole,
   the second mounting hole and the end plate mounting hole are coaxial, and
   the battery module further comprises a fastener penetrating through the second mounting hole and the end plate mounting hole and connecting the end plate with the at least one heat insulation component.

7. The battery module according to claim 1, wherein each of the at least one heat insulation component comprises a connecting post, the end plate comprises an end plate mounting hole, and the connecting post is inserted into the end plate mounting hole to connect the at least one heat insulation component with the end plate.

8. The battery module according to claim 2, wherein each of the at least one mounting portion comprises a mounting plate provided with the first mounting hole, and reinforcing plates provided at two sides of the mounting plate, and
   the mounting plate and the reinforcing plates are connected to the insulation body.

9. The battery module according to claim 8, wherein each of the at least one heat insulation component comprises a thickness greater than a depth of the first mounting hole, each of the at least one heat insulation component comprises an upper end surface protruding from an upper surface of the mounting plate by 0 mm to 2 mm, and a lower end surface protruding from a lower surface of the mounting plate by 0 mm to 2 mm.

10. The battery module according to claim 1, wherein each of the at least one heat insulation component is made of epoxy resin, plastic, or ceramic.

* * * * *